(12) United States Patent
Gerardo

(10) Patent No.: US 9,505,342 B2
(45) Date of Patent: Nov. 29, 2016

(54) COMPACT MULTI-FUNCTION LED LIGHTHEAD

(71) Applicant: Whelen Engineering Company, Inc., Chester, CT (US)

(72) Inventor: Tony Gerardo, Bristol, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 317 days.

(21) Appl. No.: 14/211,158

(22) Filed: Mar. 14, 2014

(65) Prior Publication Data

US 2014/0268855 A1    Sep. 18, 2014

Related U.S. Application Data

(60) Provisional application No. 61/790,744, filed on Mar. 15, 2013.

(51) Int. Cl.
*B60Q 1/26* (2006.01)
*F21S 8/10* (2006.01)

(52) U.S. Cl.
CPC ............ *B60Q 1/2615* (2013.01); *F21S 48/211* (2013.01); *F21S 48/212* (2013.01); *F21S 48/215* (2013.01); *F21S 48/24* (2013.01)

(58) Field of Classification Search
CPC ......... B60Q 1/26; B60Q 1/265; F21S 48/21; F21S 48/211; F21S 48/212; F21S 48/214; F21S 48/215
See application file for complete search history.

(56) References Cited

U.S. PATENT DOCUMENTS

| 4,754,375 | A |   | 6/1988 | Ferenc |   |
|---|---|---|---|---|---|
| 5,567,036 | A | * | 10/1996 | Theobald | B60Q 1/2607 362/236 |
| 6,241,373 | B1 | * | 6/2001 | Kelley | B60Q 1/32 362/184 |
| 6,425,678 | B1 | * | 7/2002 | Verdes | F21V 29/89 257/E25.019 |
| 6,598,996 | B1 | * | 7/2003 | Lodhie | B60Q 1/2607 362/235 |

(Continued)

OTHER PUBLICATIONS

International Search Report and Written Opinion mailed Aug. 12, 2014 (PCT/US2014/027613).

(Continued)

*Primary Examiner* — Peggy Neils
*Assistant Examiner* — Alexander Garlen
(74) *Attorney, Agent, or Firm* — Alix, Yale & Ristas, LLP

(57) ABSTRACT

A multifunction lighthead for mounting to a vehicle includes several groups of LEDs arranged to provide distinct light emission patterns. Each group of LEDs and associated optics are selected and positioned to produce light emission patterns needed to meet lighting standards applicable to the vehicle. Such standards may require wide angle light emission, which is enhanced by supporting groups of LEDs that project away from the vehicle body, enhancing visibility of the lighthead from directions close to a plane defined by the body panel. The projecting support for the LEDs and optics for a wide angle light emission pattern may be employed to support LEDs arranged for ground illumination. Other groups of LEDs in the same lighthead may be arranged with optics to provide area illumination in support of arrest, search, triage or other emergency functions.

20 Claims, 9 Drawing Sheets

(56) References Cited

U.S. PATENT DOCUMENTS

| | | |
|---|---|---|
| 6,863,424 B2 | 3/2005 | Smith |
| 7,245,203 B2 | 7/2007 | Stephens et al. |
| 7,712,931 B1 | 5/2010 | Smith |
| 7,794,124 B2 * | 9/2010 | Hulsey .................... B63B 45/04 362/249.02 |
| 2006/0039159 A1 | 2/2006 | Grote, III et al. |
| 2006/0239021 A1 | 10/2006 | Inaba |
| 2007/0183168 A1 | 8/2007 | Naganawa et al. |
| 2010/0013366 A1 * | 1/2010 | Hare .................... F21S 48/1154 313/46 |
| 2010/0271818 A1 | 10/2010 | Smith |

OTHER PUBLICATIONS

"Whelen: V-Series Super-LED® Surface Mount Lighthead," product description, http://www.emergencyequipmentnews.net/2013/01/27/whelen-v-series-super-led-surface-mount-lighthead/, 2013.

SoundOff Signal Products Brochures; http://www.soundoffsignal.com/, 2013.

* cited by examiner

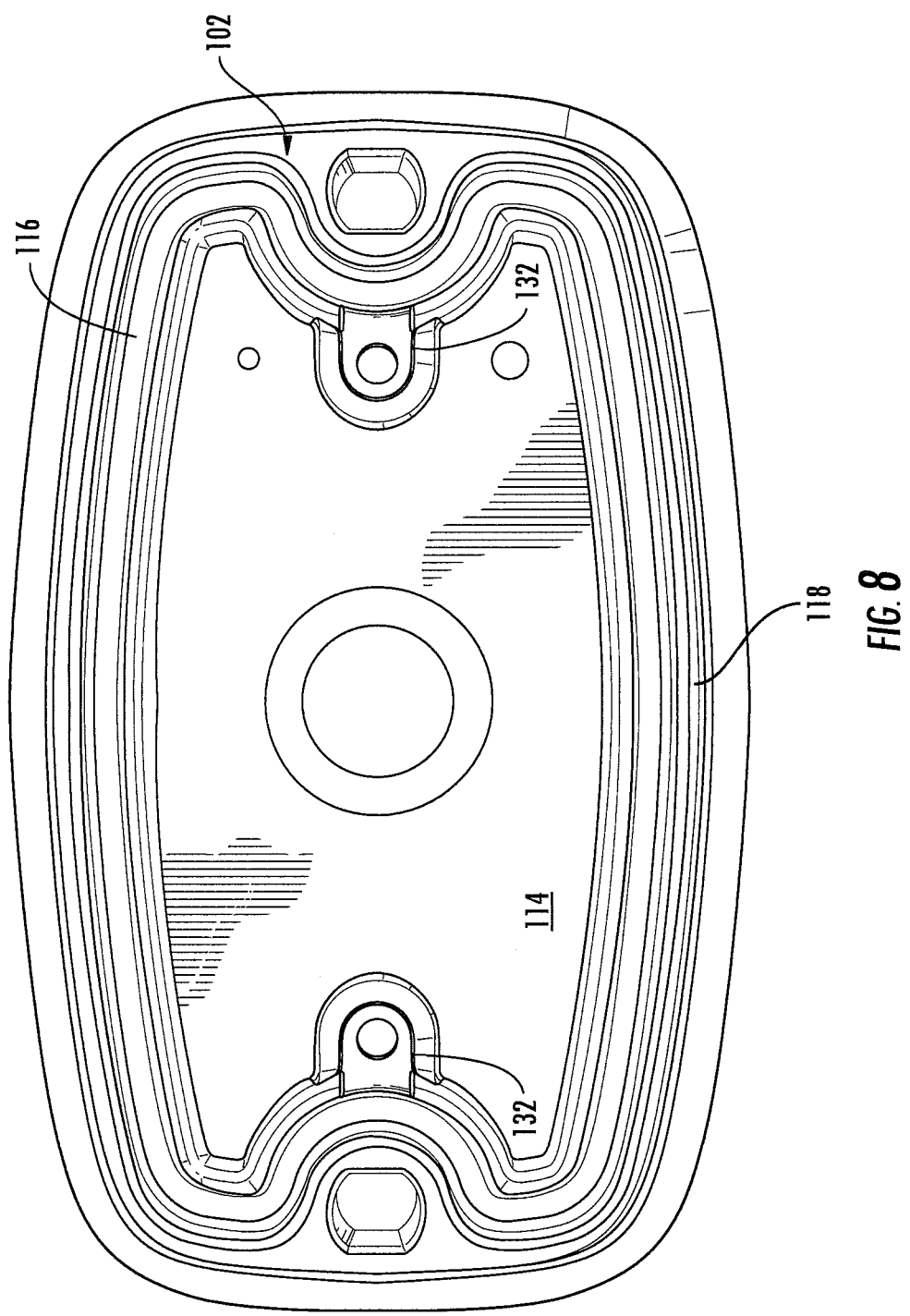

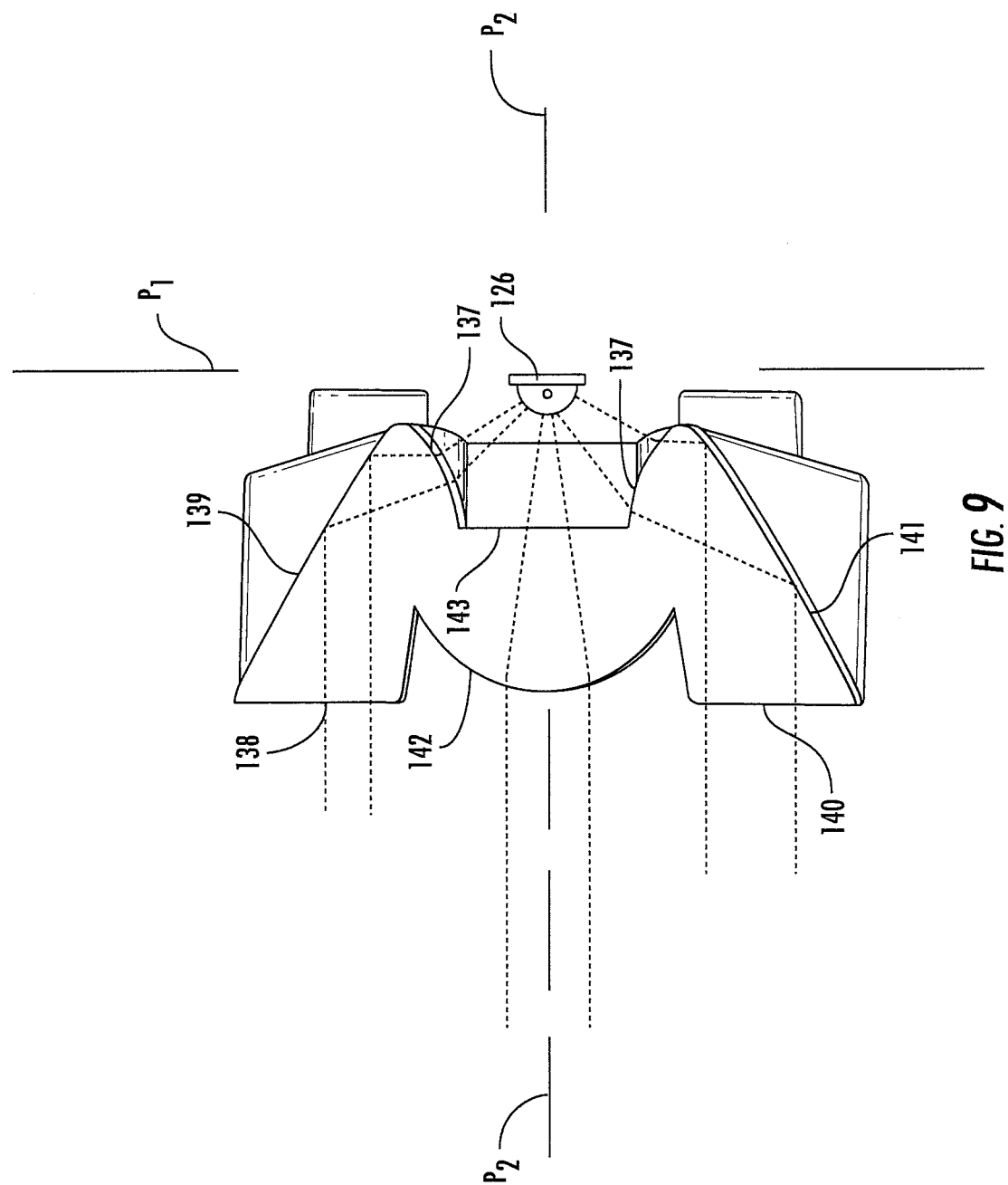

ABSTRACT
COMPACT MULTI-FUNCTION LED LIGHTHEAD

BACKGROUND OF THE DISCLOSURE

The present disclosure relates to lightheads, and more particularly, to LED lightheads for mounting to vehicles.

Lightheads for mounting to a motor vehicle may be mounted in any one of a multitude of positions and orientations to provide specific lighting functions. Some examples of lighting functions include fog lighting, warning lighting, spot lighting, takedown lighting, ground lighting, and alley lighting, each having directional, intensity, color and emission pattern requirements. Emergency vehicles often utilize lightheads to give visual indications of their presence during emergencies. Different types of emergency vehicles must meet distinct requirements for emergency warning lights, frequently requiring many distinct warning light modules to be mounted to body panels. Mounting each distinct warning light may require one or more holes in the body panel and running electrical power to the location of each warning light. The multiplicity of warning lights can complicate the manufacture of emergency vehicles. Warning light modules may also be referred to as lightheads. Relevant standards include California Title 13, NFPA standards for firefighting equipment and the Federal KKK standard for ambulances. These standards may include ground lighting and scene lighting requirements in addition to standards for warning light signals intended to alert motorists and individuals at any position around the vehicle.

The mounting location for a lighthead may relate to the specific lighting function that the lighthead serves. Lightheads are commonly mounted to any of a number of surfaces on a motor vehicle. Surfaces to which the lightheads are mounted may include the front grille, side panels, front bumper, rear bumper, brush guard, push bumper, roof, roof rack, and/or side-view mirrors.

Traditional lightheads may provide limited functionality in each individual unit. Most lightheads are designed for a specific function, and have the ability to produce a specific light emission pattern. In order to provide light emission for different functions and required standards, a vehicle must traditionally utilize multiple lightheads, each lighthead configured for the desired function and pattern of illumination.

Accordingly, there is a need in the market for a compact, multifunction LED lighthead.

SUMMARY

According to aspects of the disclosure, a compact multi-function LED lighthead comprises a thermally conductive base parallel with a vertically oriented plane, first and second PC boards, a support, at least first and second pluralities of LEDs, and a light-transmissive lens attachable to the base.

The first PC board is mounted in thermally conductive relationship to the base. The support has first and second surfaces which are oriented transverse to one another in a generally v-shaped configuration. The support is connected in thermally conductive relationship to the base and extends away from the vertical plane defined by the base. A first plurality of LEDs are mounted in groups to the first and second support surfaces and configured to emit a first distinct light emission pattern in a generally horizontal direction.

In one embodiment, an optic covers each group of the first plurality of LEDs. The optic is a wide-angle collimator having swept ends which creates a wider angle light emission pattern than is possible with LEDs alone.

A second PC board extends perpendicularly away from the first PC board and is adjacent to the bottom edges of the first and second surfaces of the support and secured beneath the support. A second plurality of LEDs are mounted to the second PC board and configured to emit a second distinct light emission pattern in a generally vertical direction. The first and second groups of LEDs may be arranged on PC boards connected by wires, or constructed with flexible connectors manufactured with the PC boards.

The configuration of the support and the position of the second PC board play important roles in generating the first and second specific patterns of light. Extending the support away from the base allows light emitted by the first plurality of LEDs to be seen at any point between vantage points close to the vertical plane, representing a side panel of an emergency vehicle. Additionally, arranging LEDs on the second PC board allows the second plurality of LEDs to emit light in a direction perpendicular to said first plurality of LEDs that is not blocked by a lip created by a recessed portion of the base, lens, and bezel in which the electronic components are secured.

In one embodiment a third plurality of LEDs are mounted to the first PC board and configured to emit a third light emission pattern in a generally horizontal direction.

A lighthead according to aspects of the current disclosure emits multiple distinct patterns of light in a single compact package, eliminating the need for multiple individual light heads. In addition to reducing clutter on the surface of an emergency vehicle, a lighthead of the current disclosure is relatively inconspicuous. Since the function of three lightheads can be served by a single lighthead mount, a lighthead of the current disclosure may be utilized for unmarked law enforcement vehicles without drawing attention.

BRIEF DESCRIPTION OF THE DRAWING

Aspects of the preferred embodiment will be described in reference to the drawings, where like numerals reflect like elements:

FIG. 8 is a frontal view of the base, all other components are omitted for clarity; and FIG. 9 shows a sectional view of the optics as seen along a vertical line passing through one die of the first plurality of LEDs.

DETAILED DESCRIPTION OF THE PREFERRED EMBODIMENT

Embodiments of a compact multi-function lighthead will now be described with reference to the Figures, wherein like numerals represent like parts throughout the FIGS. 1-8.

Figure 1:
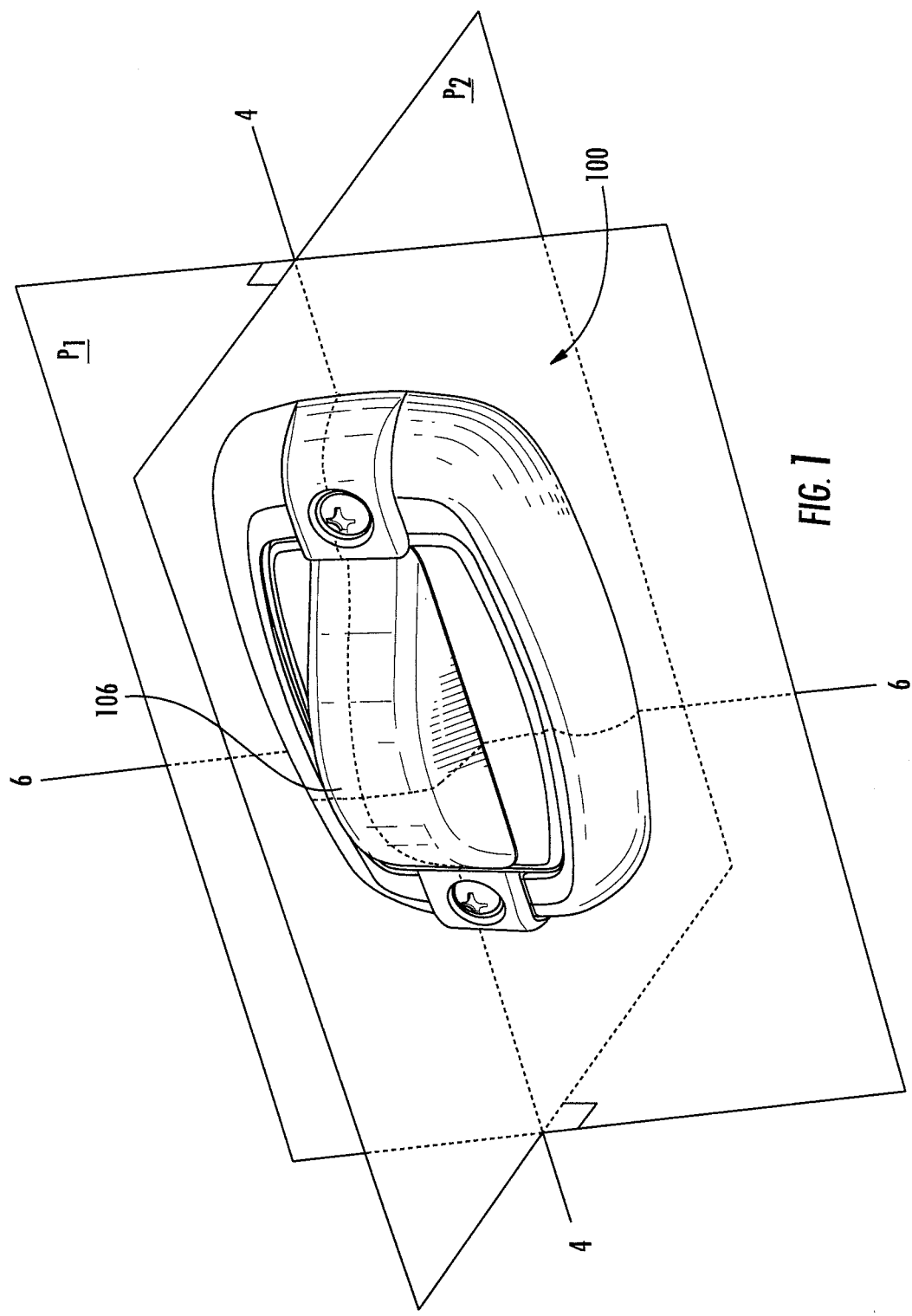
FIG. 1 is a perspective view of a fully assembled embodiment of a compact multi-function lighthead of the current disclosure, planes $P_1$ and $P_2$ are included for illustrative purposes.
Figure 2:
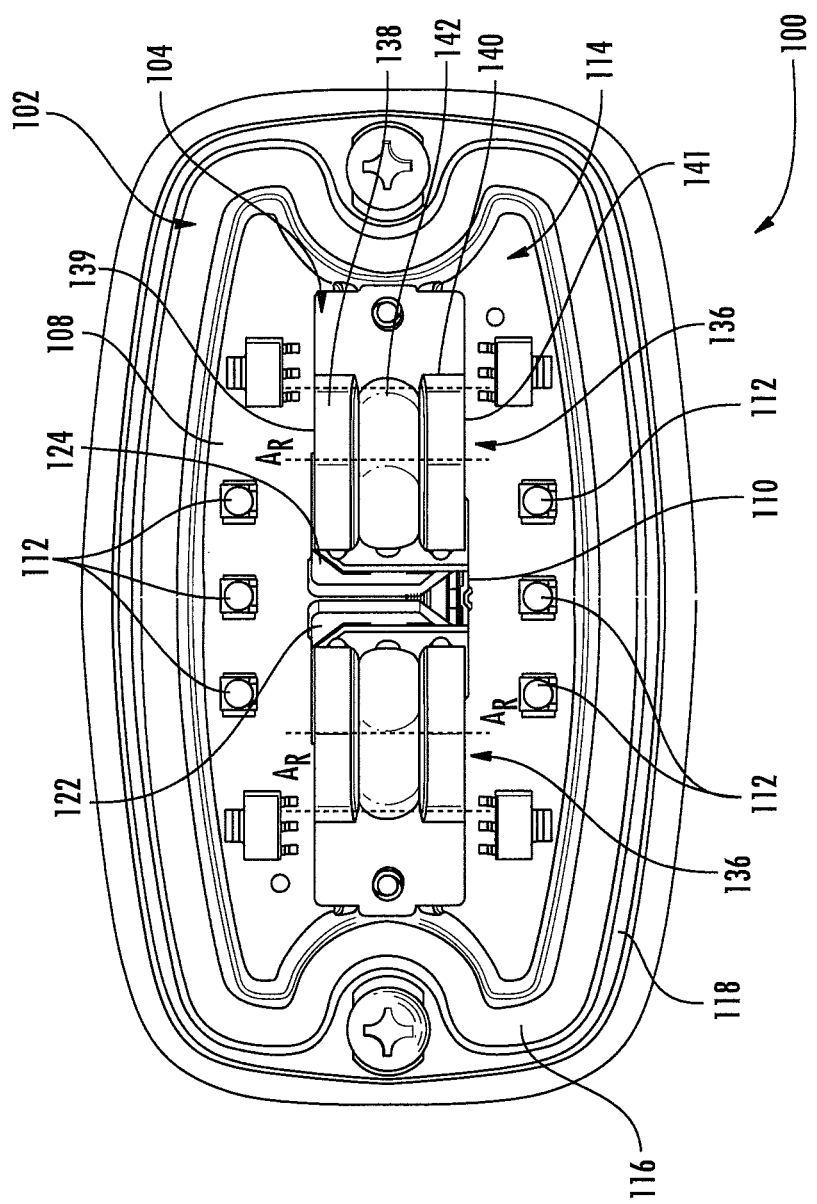
FIG. 2 is a frontal view of the lighthead of FIG. 1, the lens and bezel are omitted for clarity.

FIGS. 1 and 2 depict a lighthead 100 for attachment to a vehicle (not shown). The lighthead 100 generally comprises a thermally conductive base 102, a thermally conductive support 104, a light transmissive lens 106 attachable to said base 102, and first and second PC boards 108 and 110, respectively. A vertically oriented plane $P_1$ is parallel with the base 102, while a horizontally oriented plane $P_2$ intersects the lighthead 100 along a length denoted by line 4-4. $P_1$ and $P_2$ perpendicularly intersect along line 4-4.

Referring to FIGS. 2 and 8, the thermally conductive base 102 has a central recessed portion 114 which is sized to receive a PC board 108. The base 102 may be constructed from die cast aluminum, or any other cost-effective material which effectively dissipates heat generated by the lighthead's electronic components. The base 102 defines a channel 116 adjacent the periphery 118 of the lighthead 100. PC board 108 is mounted in thermally conductive relationship to the base 102 using any manner known in the art to provide strong retentive forces without impeding heat transfer between PC board 108 and the base 102. In the disclosed embodiment, PC board 108 is generally coplanar with $P_1$.

Figure 3:
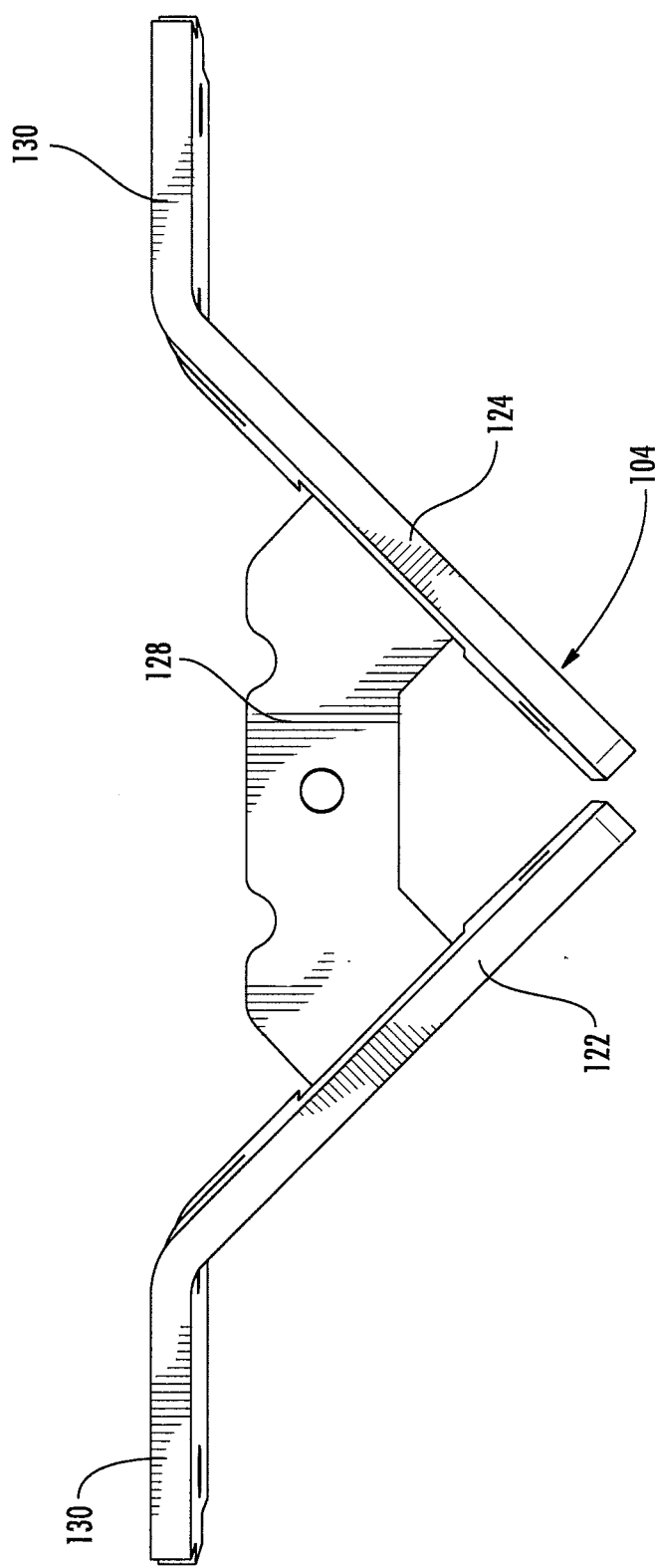
FIG. 3 is a top-plan view of the support, all other components of the lighthead are omitted for clarity.

Referring to FIG. 3, the support 104 is a unitary piece of sheet metal cut and bent to provide LED support surfaces 122, 124. A structural cross-piece 128 extends between and connects first and second surfaces 122 and 124, respectively. End tabs 130 extend from surfaces 122, 124 and provide a thermally conductive path away from LEDs 126. In the disclosed embodiment, the first and second surfaces 122 and 124 are oriented substantially transverse to one another, and extend away from the plane $P_1$. Other angular relationships between surfaces 122, 124 are compatible with the disclosed lightheads. The position and orientation of the surfaces 122, 124 and the associated LEDs 126, is designed to produce a warning light signal meeting the requirements for a 180° warning light and enhance visibility of the lighthead to individuals positioned close to a plane represented by the vehicle body panel upon which the lighthead is mounted. Conventional panel mounted warning lights meeting this standard typically lack visibility from such vantage points. The cross-piece 128 reinforces the first and second surfaces 122 and 124, and provides a secure attachment point for the second PC board 110 (described in further detail below).

Figure 4:
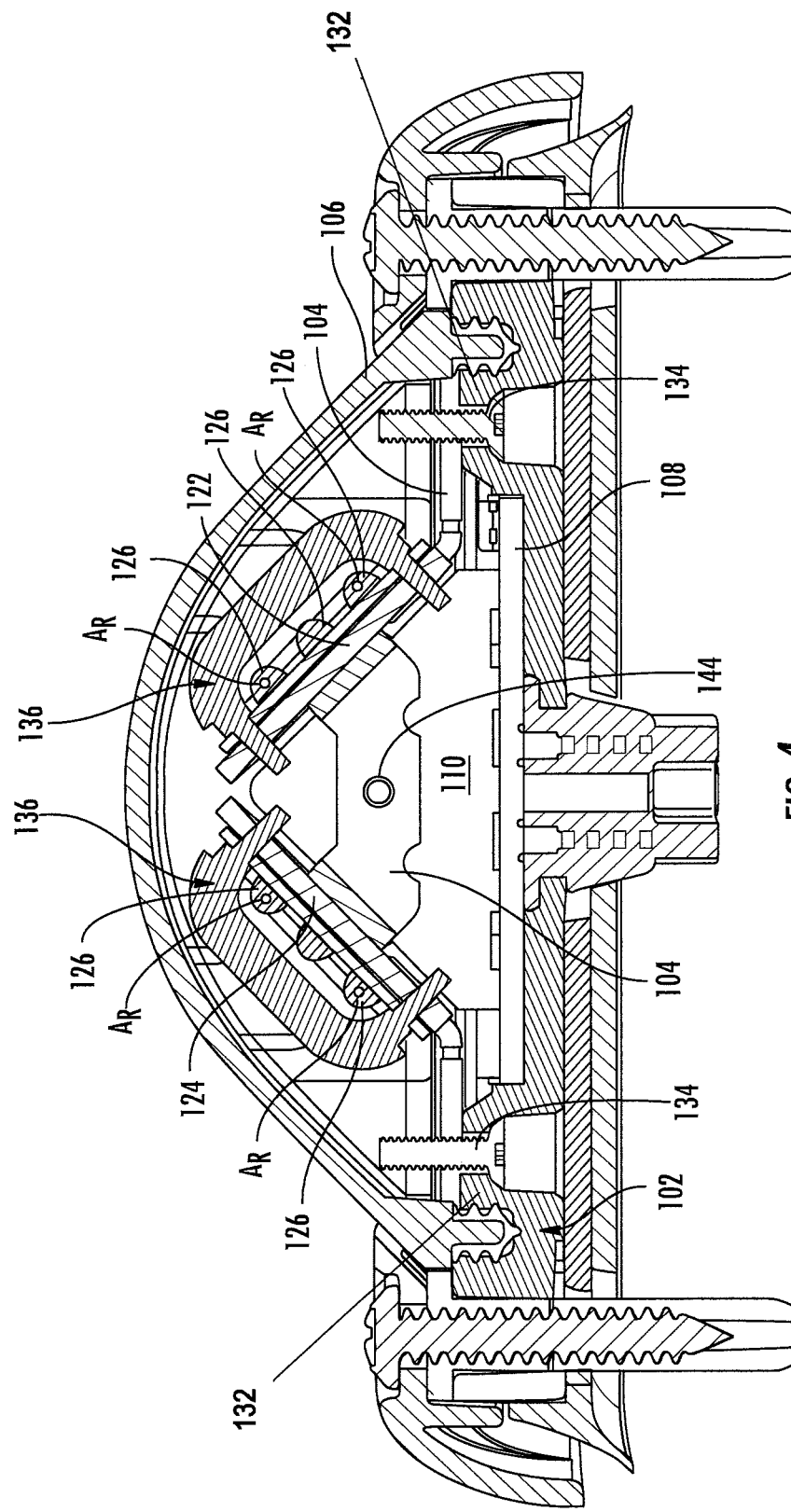
FIG. 4 is a cross-sectional view of the lighthead taken along line 4-4 of FIG. 1.
Figure 5:
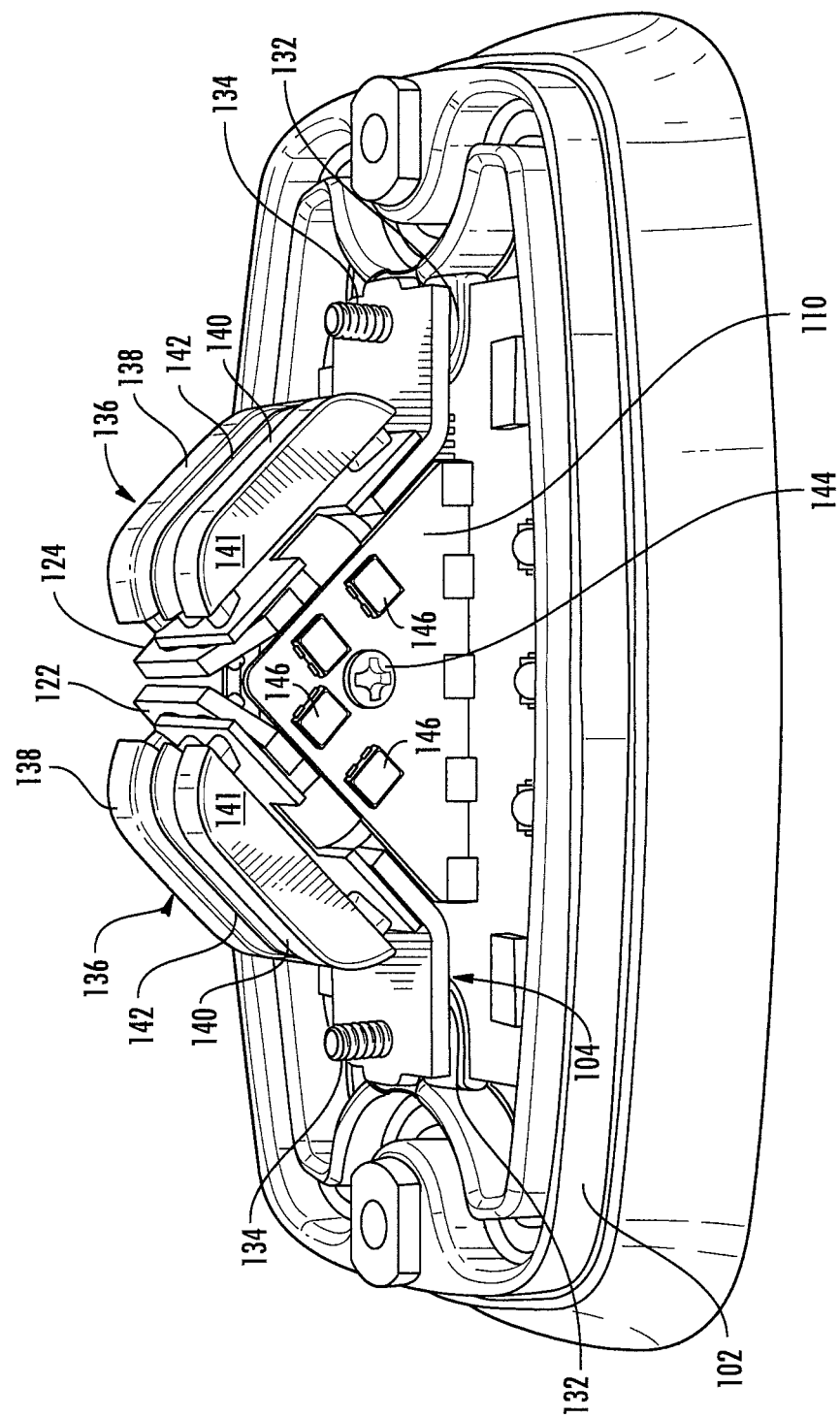
FIG. 5 shows a bottom perspective view, of the lighthead of FIG. 1, the lens and the bezel are omitted for clarity.

The support 104 is mounted in thermally conductive relationship to the base 102. As shown in FIGS. 4 and 5, the support 104 is secured at the end tabs 130 via fasteners 134 to a pair of platforms 132 (see also FIG. 8) raised from the recessed portion 114 of the base 102. The platforms 132 extend the connection point between the support 104 and the base 102 away from the vertically oriented plane $P_1$.

A first plurality of LEDs 126 are mounted to PC boards 127 secured in thermally conductive relationship to the first and second surfaces 122 and 124 and provide a first distinct light emission pattern. Power is delivered to PC boards 127 through flexible connectors fabricated as part of PC boards 110 and 127, though other electrical connections between PC boards are known and compatible with the disclosed embodiment. The first plurality of LEDs 126 are arranged to emit light in a generally horizontal wide angle beam. In one embodiment, the first plurality of LEDs 126 and the support 104 are configured to provide high visibility over 180° centered on a line vertically bisecting the lighthead 100. The first plurality of LEDs 126 and optics 136 are configured to generate a light emission pattern meeting the photometric intensity and spread requirements of the Society of Automotive Engineers (SAE) Standard J 845 class 1.

As shown in FIGS. 2, 4, and 5, optics 136 cover each group of the first plurality of LEDs 126 and cooperate with the first plurality of LEDs 126 to provide the first distinct light emission pattern. The optics 136 collimate the light emitted from the LEDs 126 into a generally horizontal direction, and spread the light emitted in a wider and more consistent pattern within the horizontal plane than is possible with the LEDs alone. Optics 136 are constructed of surfaces designed to cooperate to produce the desired vertically collimated, wide-angle beam according to well-understood optical principles. As best seen in FIG. 9, the optic 136 has top, bottom and intermediate emission surfaces 138, 140, and 142, respectively. Refracting surfaces 137 cooperate with internal reflecting surfaces 139, 141 to re-direct light emitted from LEDs 126 into directions generally parallel with plane $P_2$. Light redirected by surfaces 137, 139 and 141 meets emission surfaces 138, 140 at a right angle and passes through emission surfaces 138, 140 with little further change in direction relative to plane $P_2$. Refracting surface 143 cooperates with curved emission surface 142 to vertically collimate light emitted from LEDs 126. Emission surface 143 also refracts light passing through it, with the shape of surfaces 142 and 143 selected to result in the desired, vertically collimated wide angle emission pattern. The internal reflecting surfaces 139 and 141 may be aspheric, as shown in the disclosed embodiment, although other known surface shapes are compatible with the disclosed multifunction lighthead 100.

Optic 136 is constructed from the sectional shape shown in FIG. 9 projected along line 4-4 and swept about an axis of revolution $A_R$ (FIGS. 2 and 4) at lateral ends of the optic 136. $A_R$ is centered on the area of light emission of the end LED 126 in each group. The lateral ends are swept in a ninety (90) degree arc about the axis of revolution $A_R$ to form curved refracting surfaces 137, 143 and curved emission surfaces 138, 140, and 142. The swept configuration of the lateral optic ends maximizes the angle of light emission in the horizontal plane $P_2$ such that light emitted by LEDs mounted to the first surface 122 overlaps with light emitted by LEDs mounted to the second surface 124 providing a continuous horizontal pattern of light emission. Optic 136 is designed to re-direct light emitted from LEDs 126 on trajectories divergent from plane $P_2$ into trajectories substantially parallel with plane $P_2$. Some vertical spread to the light emission pattern from LEDs 126 is permissible and may be necessary to meet the relevant light emission standard. Generally speaking the vertical spread of the desired wide angle horizontal beam is less than 20° up or down relative to plane $P_2$ and desirably less than 10° up or down relative to plane $P_2$.

The support 104 provides clearance away from a mounting surface of a vehicle (not shown), extending LEDs 126 and optic 136 beyond a bezel 150 (see FIG. 4) which would otherwise impede visibility of the light signal from directions close to plane $P_1$. Accordingly, the optics 136, V-shaped design of the support 104, and raised platforms 132 improve visibility from vantage points close to $P_1$. As one example, these vantage points correspond to that of pedestrians or motorists in front and behind a vehicle and close to the vehicle's path of travel when the subject multifunction lightheads 100 are mounted to the side body panels of the vehicle. The enhanced visibility of the subject lightheads is intended to supplement light signals generated by warning lights mounted to the front and rear of the vehicle.

In the embodiment where the first plurality of LEDs 126 comply with SAE standards J845 class 1, the first plurality of LEDs 126 emit a high intensity vertically collimated wide-angle beam of light which may be seen at any point between vantage points coplanar with $P_1$. Consequently, when the lighthead is mounted on the side panels of an emergency vehicle, pedestrians and motorists positioned directly behind or directly in front of the emergency vehicle can see light emitted by the first plurality of LEDs 126.

Figure 6:
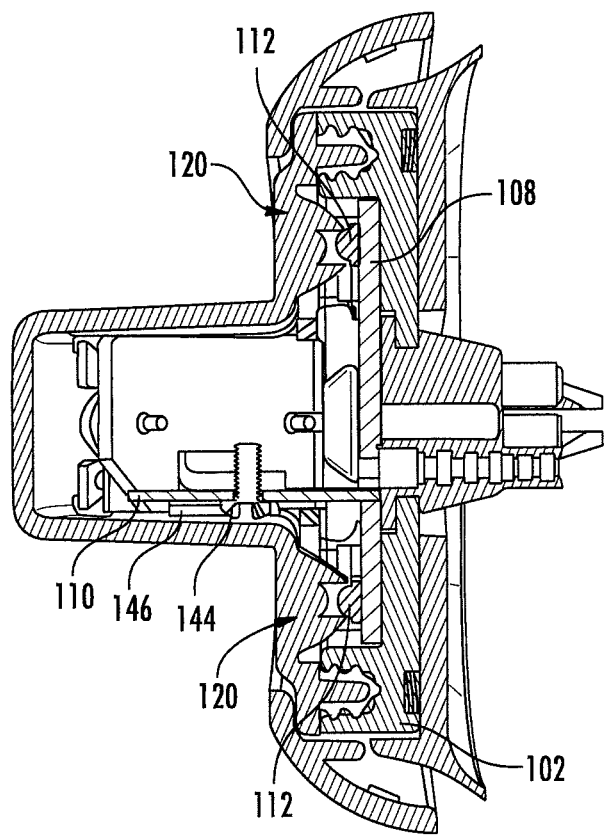
FIG. 6 is a cross-sectional view of the lighthead taken along line 6-6 of FIG. 1.

Referring to FIGS. 4, 5 and 6 PC board 110 projects perpendicularly from the first PC board 108. The second PC board 110 may be soldered to the first PC board and a fastener 144 or other means may secure the second PC board 110 to the cross-piece 128 of the support 104. Alternatively, plug type connectors may be used to form electrical connections between the first and second PC boards 108, 110. The second PC 110 board projects as far from plane $P_1$ as the support 104.

As best seen in FIGS. 5 and 6, a second plurality of LEDs 146 are mounted to the second PC board 110. The second plurality of LEDs 146 is arranged on the second PC board 110 to provide a second distinct light emission pattern. As shown in FIGS. 5 and 6, the second plurality of LEDs are oriented to emit light in a direction transverse to plane $P_2$. The second plurality of LEDs 146 may function as ground lights, and are mounted at a position on the second PC board 110 so that the light the second plurality of LEDs 146 emits is not blocked by the lip created by the central recessed portion 114 and the peripheral base channel 116 or bezel. Altering the dimensions of the lighthead 100 so that a greater surface area projects beyond the lip and bezel provides more surface area to which the second plurality of LEDs 146 may be attached, and increases the potential for a greater degree of illumination from the second plurality of LEDs 146.

A third plurality of LEDs 112 are mounted to the first PC board 108. The third plurality of LEDs 112 are oriented to emit beams of light in a generally horizontal direction. The type of LED utilized in the third plurality of LEDs 112 is selected to provide a specific third distinct light emission pattern e.g. illumination in support of search, traffic stop, rescue, and arrest activities.

In one embodiment, the third plurality of LEDs 112 are high intensity white LEDs. High intensity white LEDs can provide a takedown light emission pattern of the type utilized by law enforcement officials when conducting a traffic stop to illuminate the cabin of the vehicle being stopped. Alternatively, high intensity white LEDs can provide an alley light emission pattern to spotlight areas to either side of the vehicle. The focused beam of light necessary to produce the takedown/alley light emission pattern is provided by an optic 120. In the embodiment shown in FIGS. 6 and 7, the optic 120 is a total internal reflection (TIR) optic molded into the lens 106. Alternatively, optic 120 or lens 106 may include features to re-direct light from LEDs 112 into a downward direction relative to plane $P_2$ to provide supplemental area illumination adjacent the body panel to which the lighthead 100 is mounted.

The location on the vehicle where the lighthead 100 is mounted determines whether the first plurality of LEDs provide a takedown or an alley lighting effect. The takedown lighting effect is provided by mounting and orienting the lighthead 100 to emit a high intensity beam of light in a direction aligned with the vehicle's direction of travel. For example, this function can be accomplished using a pedestal mount (not shown) connected to the push bumper or front bumper of the vehicle. The takedown light emission pattern may alternately be provided by mounting the lighthead to the front grille of the vehicle.

The alley light emission pattern is provided by mounting and orienting the lighthead 100 to emit a high intensity beam of light in a direction generally transverse to the vehicle's direction of travel. For example, the alley light emission pattern may be provided by mounting the lighthead 100 to the front quarter panel, door panel, or side view mirror of the vehicle.

Figure 7:
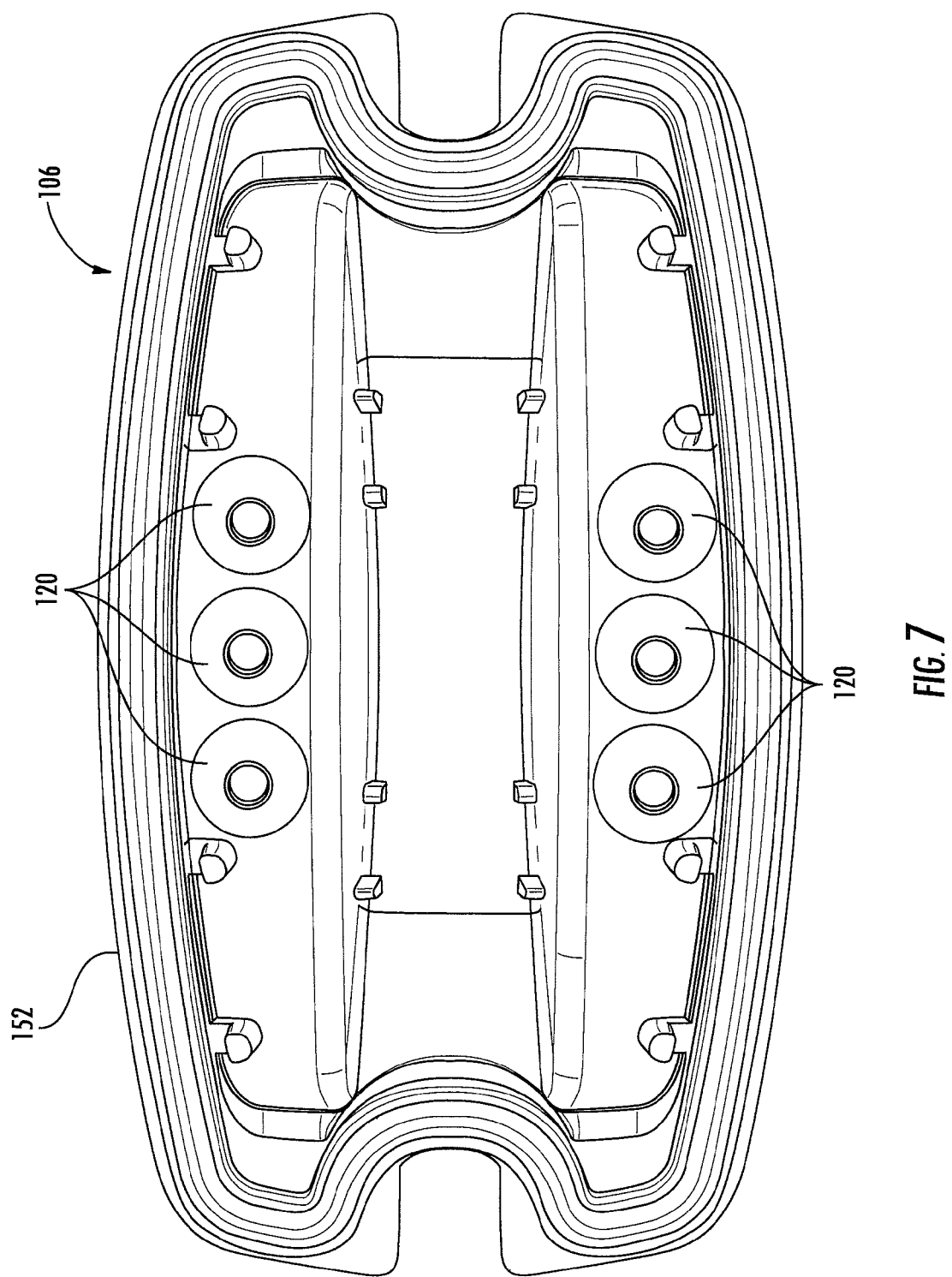
FIG. 7 shows the rearward-facing side of the lens, all other components of the lighthead are omitted for clarity.

In the embodiment shown in FIGS. 4, 6 and 7, the lens 106 is secured to the base 102 in weather-tight relationship. A seal 148 projects from the interior-facing side of the lens 106 along a periphery of the lens 152 in a configuration complementary to the peripheral channel 116. In the disclosed embodiment a bezel 150 secures the lens 106 in weather tight communication against the base 102, though the bezel may not be required.

As seen in FIGS. 4 and 6, a gasket 154 projects from the perimeter of the base 118 in a direction opposite the lens 106. In embodiments where the lighthead 100 is mounted directly to the surface of a vehicle, the gasket ensures a weather tight seal against the vehicle, preventing salt and moisture from penetrating behind the lighthead 100.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A lighthead for mounting to a vehicle comprising:
    a thermally conductive base generally parallel to a first plane;
    a first PC board mounted in thermally conductive relationship to said base and generally coplanar with said plane;
    a support in thermally conductive relationship to said base, having first and second support surfaces oriented transverse to one another and intersected by a second plane perpendicular to said first plane, a first plurality of LEDs mounted to said first and second support surfaces oriented to emit a continuous band of light subtending an arc of at least 90 degrees in said second plane in a generally horizontal direction and providing a first distinct light emission pattern perpendicular to said first plane, said arc centered on a line perpendicular to said first plane; and
    a second PC board extending perpendicularly from said first PC board, and contiguous with said first and second support surfaces, a second plurality of LEDs mounted to said second PC board and providing a second distinct light emission pattern having a direction perpendicular to said second plane and parallel to said first plane; and
    at least one light-transmissive lens attachable to said base.

2. The lighthead of claim 1, wherein the vehicle has a direction of travel and a third plurality of LEDs is mounted to said first PC board and oriented to emit light in a generally horizontal direction and providing a third distinct light emission pattern.

3. The lighthead of claim 2, wherein the vehicle has a direction of travel and the third plurality of LEDs are high intensity LEDs which emit light in a direction generally collinear with the vehicle's direction of travel.

4. The lighthead of claim 2, wherein the vehicle has a direction of travel and the third plurality of LEDs are high intensity LEDs which emit a light in a direction generally transverse to the vehicle's direction of travel.

5. The lighthead of claim 2, wherein said second plurality of LEDs emit light in a direction transverse to the direction in which light is emitted from the first and third plurality of LEDs.

6. The lighthead of claim 1, wherein the first plurality of LEDs emit a high intensity beam of collimated light which can be seen at any vantage point between points coplanar with said first plane.

7. The lighthead of claim 1, wherein an optic spreads said light from said first plurality of LEDs on said first and second support surfaces up to 180 degrees in said second plane.

8. The lighthead of claim 7, wherein said first plurality of LEDs satisfy the minimum photometric requirements of Society of Automotive Engineers Standard J845 Class 1.

9. The lighthead of claim 2, wherein said third plurality of LEDs are arranged in first and second groups of LEDs, said support is disposed intermediate said first and second groups of said third plurality of LEDs and mounted at laterally opposed first and second end tabs to a pair of raised platforms in thermally conductive relationship with and extending generally perpendicularly away from said base.

10. The lighthead of claim 1, wherein a gasket projects from a perimeter of said base in a direction opposite said lens such that said lighthead is sealable in weather tight communication against a surface of the vehicle.

11. The lighthead of claim 1, wherein the base defines a channel adjacent a perimeter of said base, a seal projects from said lens around a lens periphery, and a bezel retains said lens intermediate said bezel and said base such that said seal is retained in weather tight communication within said channel.

12. A light head for mounting to a vehicle comprising:
a thermally conductive base defining a plane;
a first PC board in thermally conductive relationship to said base and coplanar with said plane,
a support in thermally conductive relationship to said base, having first and second support surfaces oriented transverse to one another and extending generally perpendicularly away from said plane, a first plurality of LEDs mounted to said first and second support surfaces oriented to emit light in a generally horizontal direction and providing a first distinct light emission pattern;
a second PC board extending perpendicularly from said first PC board, and contiguous with said first and second support surfaces, a second plurality of LEDs mounted to said second PC board oriented to emit light in a generally vertical direction and providing a second distinct light emission pattern;
a third plurality of LEDs mounted to said first PC board oriented to emit light in a generally horizontal direction and providing a third distinct light emission pattern;
at least one light-transmissive lens attachable to said base.

13. The lighthead of claim 12, wherein the vehicle has a direction of travel and the third plurality of LEDs are high intensity LEDs which emit light in a direction generally collinear with the vehicle's direction of travel.

14. The lighthead of claim 12, wherein the vehicle has a direction of travel and the third plurality of LEDs are high intensity LEDs which emit a light in a direction generally transverse to the vehicle's direction of travel.

15. The lighthead of claim 12, wherein the first plurality of LEDs emit a high intensity beam of collimated light which can be seen between at any vantage point between points coplanar with said plane.

16. The lighthead of claim 15, wherein an optic spreads said light from said first plurality of LEDs on said first and second support surfaces up to 180 degrees in said second plane.

17. The lighthead of claim 15, wherein said first plurality of LEDs satisfy the minimum photometric requirements of Society of Automotive Engineers Standard J845 Class 1.

18. The lighthead of claim 12, wherein said third plurality of LEDs are arranged in first and second groups of LEDs, said support is disposed intermediate said first and second groups of said third plurality of LEDs and mounted at laterally opposed first and second end tabs to a pair of raised platforms in thermally conductive relationship with and extending generally perpendicularly away from said base.

19. The lighthead of claim 12, wherein said second plurality of LEDs emit light in a direction transverse to the direction in which light is emitted from the first and second plurality of LEDs.

20. The lighthead of claim 12, wherein the base defines a channel adjacent a perimeter of said base, a seal projects from said lens around a lens periphery, and a bezel retains said lens intermediate said bezel and said base such that said seal is retained in weather tight communication within said channel.

\* \* \* \* \*